US 9,036,114 B2

(12) United States Patent
Kubota

(10) Patent No.: US 9,036,114 B2
(45) Date of Patent: May 19, 2015

(54) POLYMER/LIQUID CRYSTAL COMPOSITE AND LIQUID CRYSTAL DISPLAY DEVICE INCLUDING THE SAME

(71) Applicant: Semiconductor Energy Laboratory Co., Ltd., Atsugi-shi, Kanagawa-ken (JP)

(72) Inventor: Daisuke Kubota, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 65 days.

(21) Appl. No.: 13/900,585

(22) Filed: May 23, 2013

(65) Prior Publication Data
US 2013/0321745 A1    Dec. 5, 2013

(30) Foreign Application Priority Data

Jun. 1, 2012  (JP) ................................. 2012-125660

(51) Int. Cl.
*G02F 1/1334* (2006.01)
*G02F 1/137* (2006.01)
*C09K 19/38* (2006.01)

(52) U.S. Cl.
CPC ............. *G02F 1/1334* (2013.01); *G02F 1/137* (2013.01); *G02F 2001/13345* (2013.01); *G02F 2001/13775* (2013.01); *G02F 2001/13793* (2013.01)

(58) Field of Classification Search
CPC ... C09K 19/0275; G02F 1/1334; G02F 1/137; G02F 2001/13775; G02F 2001/13793; G02F 2001/13345
USPC ................ 252/299.01, 299.5, 299.67; 349/86
See application file for complete search history.

(56) References Cited

U.S. PATENT DOCUMENTS

| 7,576,829 | B2 | 8/2009 | Kikuchi et al. | |
|---|---|---|---|---|
| 2012/0138853 | A1 | 6/2012 | Kubota et al. | |
| 2012/0249928 | A1* | 10/2012 | Kaihoko et al. | 349/69 |
| 2012/0286198 | A1 | 11/2012 | Ikenaga et al. | |
| 2012/0305914 | A1* | 12/2012 | Uochi et al. | 257/43 |
| 2013/0009094 | A1 | 1/2013 | Tamura et al. | |
| 2013/0020023 | A1 | 1/2013 | Kubota et al. | |
| 2013/0242233 | A1* | 9/2013 | Kubota et al. | 349/73 |

FOREIGN PATENT DOCUMENTS

WO    WO 2005-090520 A1    9/2005

* cited by examiner

*Primary Examiner* — Shean C Wu
(74) *Attorney, Agent, or Firm* — Nixon Peabody LLP; Jeffrey L. Costellia

(57) ABSTRACT

The occurrence of a defective orientation of a polymer/liquid crystal composite is suppressed. In addition, the occurrence of defective display of a liquid crystal display device including the polymer/liquid crystal composite is suppressed. In the polymer/liquid crystal composite exhibiting a blue phase, a plurality of domains are included and defective orientations easily occur at boundaries between the domains. Thus, by lowering orientation periodicities at boundaries between the domains, a defect-free orientation to high orientation periodicities at the boundary between adjacent domains can be obtained. Specifically, the polymer/liquid crystal composite exhibiting the blue phase includes the plurality of domains each of which has a size of 3 μm or less.

12 Claims, 4 Drawing Sheets

POLYMER/LIQUID CRYSTAL COMPOSITE AND LIQUID CRYSTAL DISPLAY DEVICE INCLUDING THE SAME

BACKGROUND OF THE INVENTION

1. Field of the Invention

The present invention relates to a polymer/liquid crystal composite, particularly, a polymer/liquid crystal composite which includes a liquid crystal material exhibiting a blue phase. The present invention also relates to a liquid crystal display device including the polymer/liquid crystal composite.

2. Description of the Related Art

As a display device which is thin and lightweight (flat panel display), a liquid crystal display device including a liquid crystal element, a display device including a self-light-emitting element, a field emission display (FED), and the like have been competitively developed.

In a liquid crystal display device, response speed of liquid crystal is required to be increased. Among various kinds of display modes of liquid crystal, liquid crystal modes capable of high-speed response are a ferroelectric liquid crystal (FLC) mode, an optically compensated bend (OCB) mode, and a mode using liquid crystal exhibiting a blue phase.

A blue phase is a liquid crystal phase which is exhibited between a chiral nematic phase having a relatively short spiral pitch and an isotropic phase, and has a feature of an extremely high response speed. A liquid crystal display device which includes a liquid crystal exhibiting a blue phase does not need an alignment film and has a wide viewing angle, and thus has been developed for practical use. However, the blue phase is exhibited only in a small temperature range of 1° C. to 3° C. between a cholesteric phase and an isotropic phase. Thus, there is a problem in that the temperature of an element needs to be controlled precisely.

In order to solve this problem, it is proposed that the temperature range where a liquid crystal material contained in a liquid crystal composition exhibits a blue phase be widened by subjecting the liquid crystal composition to polymer stabilization treatment (e.g., Patent Document 1). Specifically, Patent Document 1 discloses a technique to stabilize a blue phase of a liquid crystal material (or to expand the temperature range where a blue phase is exhibited) with a polymer (polymer network) formed by photopolymerization or thermal polymerization of monomers contained in the liquid crystal composition.

REFERENCE

[Patent Document 1] PCT International Publication No. 2005/090520

SUMMARY OF THE INVENTION

In some cases, however, a polymer/liquid crystal composite that can be obtained by the above-described polymer stabilization treatment does not exhibit a blue phase, that is, a liquid crystal material which exhibits a blue phase exhibits a phase other than the blue phase, which is hereinafter referred to as defective orientation. This directly leads to defective display of a liquid crystal display device including the polymer/liquid crystal composite.

The defective orientation partly arises from a structure of a polymer/liquid crystal composite exhibiting a blue phase. The polymer/liquid crystal composite exhibiting a blue phase typically includes a plurality of domains. Adjacent domains have orientation periodicities; in other words, the orientation periodicity of the domain is different from the oriental periodicity of the adjacent domain in at least one of a polar angle and an azimuth angle. The plurality of domains have high orientation periodicities. The size of each domain is relatively large between 5 μm to 10 μm.

In the case where the polymer/liquid crystal composite includes a plurality of domains having high orientation periodicities, an exhibition of a phase other than a blue phase, such as a cholesteric phase, that is, a defective orientation might locally occur at a boundary between adjacent domains or in one domain. This is probably because the orientation periodicities of the domains are too high, so that the domains are separated or the continuity between the domains is reduced at the boundaries between the domains.

In the case where a liquid crystal cell is manufactured using the above-described polymer/liquid crystal composite, that is, the polymer/liquid crystal composite is sealed between a pair of substrates, the size of a domain in the polymer/liquid crystal composite becomes larger than a cell gap (i.e., the distance between the pair of substrates) of the liquid crystal cell as the cell gap decreases. Further, a defective orientation might occur along a boundary between domains. This causes the boundary between the domains to longitudinally cross the cell gap; thus, a defective orientation occurs more easily.

In view of the above problems, an object of one embodiment of the present invention is to suppress the occurrence of a defective orientation of polymer/liquid crystal composite. Another object is to suppress the occurrence of defective display of a liquid crystal display device including the polymer/liquid crystal composite.

A polymer/liquid crystal composite exhibiting a blue phase includes a plurality of domains, and a defective orientation easily occurs at boundaries between the domains. Thus, by lowering the orientation periodicities at the boundaries between the domains, the occurrence of the defective orientation due to high orientation periodicities at the boundary between adjacent domains can be suppressed. Details thereof are described below.

One embodiment of the present invention is a polymer/liquid crystal composite exhibiting a blue phase. The polymer/liquid crystal composite includes a plurality of domains each of which has a size of 3 μm or less.

The polymer/liquid crystal composite including the plurality of domains each of which has a size of 3 μm or less can also be called a microcrystalline multi-domain structure for the size. By setting the size of each domain to the above value, the orientation periodicities of the domains can be lowered. Even when the domains have high orientation periodicities, a defective orientation can be prevented owing to the above domain size.

Another embodiment of the present invention is a polymer/liquid crystal composite with the above structure, in which the size of each domain is smaller than or equal to a cell gap of a liquid crystal cell.

By making the size of each of the plurality of domains included in the polymer/liquid crystal composite smaller than or equal to a cell gap of a liquid crystal cell, a boundary between the domains does not longitudinally cross the cell gap, which can reduce defective orientations.

Another embodiment of the present invention is a liquid crystal display device including any of the above-described polymer/liquid crystal composites.

In the polymer/liquid crystal composite of one embodiment of the present invention, the occurrence of a defective orientation can be suppressed. It is accordingly possible to reduce defective display of a liquid crystal display device including the polymer/liquid crystal composite.

DETAILED DESCRIPTION OF THE INVENTION

Figure 1:
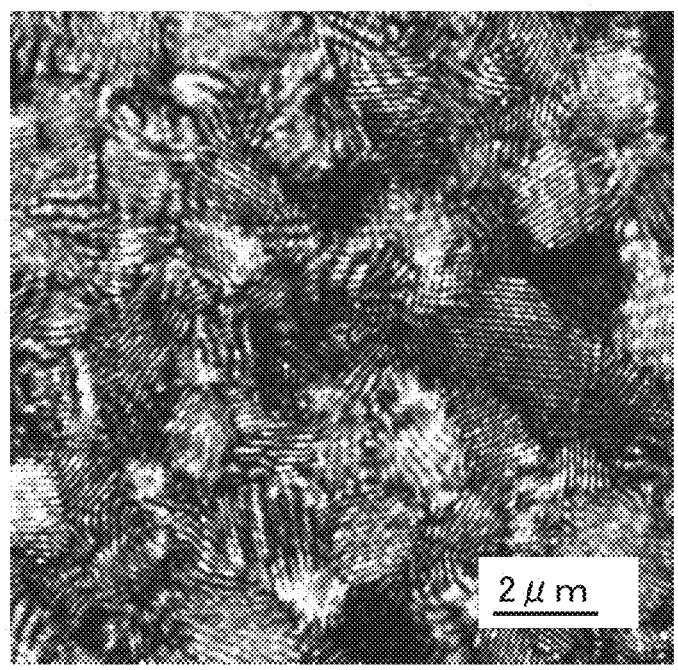
FIG. 1 shows a texture of a polymer/liquid crystal composite.

Hereinafter, embodiments of the present invention will be described in detail. Note that the present invention is not limited to the description below, and a variety of changes can be made without departing from the spirit and scope of the present invention. Therefore, the invention should not be construed as being limited to the description below.

Note that in some cases, the position, size, range, and the like of each component illustrated in the drawings and the like are not accurately represented for easy understanding. Therefore, the disclosed invention is not necessarily limited to the position, size, range, and the like in the drawings and the like.

(Embodiment 1)

In this embodiment, a polymer/liquid crystal composite exhibiting a blue phase, which is one embodiment of the present invention, will be described with reference to FIG. 1.

FIG. 1 shows an example of a texture of the polymer/liquid crystal composite exhibiting a blue phase, which is one embodiment of the present invention. The texture is observed with a microscope (e.g., a confocal laser microscope).

According to the observed texture of the polymer/liquid crystal composite exhibiting a blue phase, which is shown in FIG. 1, the texture includes a plurality of domains each of which has a size of 3 µm or less. The polymer/liquid crystal composite including the domains each of which has a size of 3 µm or less can also be called a microcrystalline multi-domain structure for the size.

Note that one domain in this specification and the like has an orientation periodicity with regularity and has a ring or an interface corresponding to the ring in a planar view. In other words, the domain with the orientation periodicity with regularity does not necessarily have a complete ring. Further, the size of a domain means the size of one domain. In other words, the size of the domain corresponds to a distance between interfaces with adjacent domains continuously having the different orientation periodicities with regularity in at least one of a polar angle and an azimuth angle.

The size of each domain is controlled to be the above-described value, so that a defective orientation due to separation of the domains or a decline in the continuity between the domains which can occur at the boundary between the domains can be suppressed, so that defect-free multi-domain orientation can be obtained. The domains have indistinct boundaries due to the partially continuous orientation periodicities between the adjacent domains.

The size of each domain can be controlled by adjusting a liquid crystal composition that can be used for the polymer/liquid crystal composite and adjusting polymer stabilization treatment performed on the liquid crystal composition.

Specifically, the liquid crystal composition that can be used for the polymer/liquid crystal composite preferably includes a liquid-crystalline monomer represented by Structural Formula (100) given below.

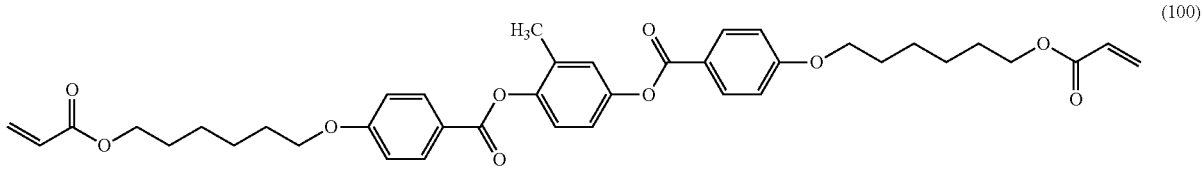 [SMILES: C=CC(=O)OCCCCCCOc1ccc(C(=O)Oc2ccc(OC(=O)c3ccc(OCCCCCCOC(=O)C=C)cc3)c(C)c2)cc1]

(100)

The material represented by Structural Formula (100) is 1,4-bis-[4-(6-acryloyloxy-n-hexyl-1-oxy)benzoyloxy]-2-methylbenzene (abbreviation: RM257-O6), which is a liquid-crystalline monomer in which the chain length (the sum of carbon atoms and oxygen atoms) of an oxyalkylene group is seven.

The use of a liquid-crystalline monomer in which the chain length of an oxyalkylene group is an odd number (e.g., 5, 7, 9, or 11) can suitably lower the orientation periodicities of a plurality of domains in a polymer/liquid crystal composite which has been subjected to polymer stabilization treatment.

Meanwhile, in the case of a polymer/liquid crystal composite exhibiting a blue phase, in which a plurality of domains are not subjected to control of the size and have different orientation periodicities (such a composite is also called a multi-domain structure), an exhibition of a phase other than a blue phase, such as a cholesteric phase, that is, a defective orientation might locally occur at a boundary between adjacent domains or in one domain. The reason is as follows: the domains have too high orientation periodicities, which cause separation of the domains or a decline in the continuity between the domains at the boundaries between the domains.

Further, in the case where the size of each domain is not controlled, the domain is relatively large between 5 µm to 10 µm. When the size of the domain increases, separation of the domains or a decline in the continuity between the domains easily occurs.

The technical idea of the present invention is that, in an observed texture of a polymer/liquid crystal composite exhibiting a blue phase, orientation periodicities of adjacent domains are lowered by controlling the size of each domain to be 3 µm or less, so that the occurrence of a defective orientation due to high orientation periodicities at the boundary between the adjacent domains is suppressed.

The texture of the polymer/liquid crystal composite exhibiting a blue phase, which is described above with reference to FIG. 1 and described above, can suppress a defect due to a defective orientation.

Note that the polymer/liquid crystal composite described in this embodiment can be formed by subjecting a liquid crystal composition including a liquid crystal material exhibiting a blue phase to polymer stabilization treatment. The liquid crystal composition, the polymer stabilization treatment, and the polymer/liquid crystal composite will be specifically described below.

<Liquid Crystal Composition>

As the liquid crystal composition, a liquid crystal composition which includes a liquid crystal material exhibiting a blue phase, a liquid-crystalline monomer, a non-liquid-crystalline monomer, and a polymerization initiator can be used.

Blue phases are phases in which light is not substantially scattered and which are optically isotropic. As the liquid crystal material exhibiting a blue phase, there are a nematic liquid-crystalline compound, a smectic liquid-crystalline compound, and the like, and the nematic liquid-crystalline compound is preferred. Note that the nematic liquid-crystalline compound is not particularly limited, and examples thereof are a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, azo- and azoxy-based compounds, a stilbene-based compound, a bicyclohexyl-based compound, a phenylpyrimidine-based compound, a biphenylpyrimidine-based compound, a pyrimidine-based compound, a biphenyl ethyne-based compound, and the like.

The liquid-crystalline monomer is a monomer that has a liquid crystallinity and can be polymerized through photopolymerization. For example, as the liquid-crystalline monomer, a monomer having a mesogenic skeleton and two alkyl chains can be used. Note that the mesogenic skeleton in this specification refers to a highly rigid unit having two or more rings such as aromatic rings. The two alkyl chains may be the same or different. The material represented by Structural Formula (100) given above is particularly preferable as the liquid-crystalline monomer.

The non-liquid-crystalline monomer refers to a monomer that does not have a liquid crystallinity, can be polymerized through photopolymerization, and does not have a rod-shaped molecular structure (for example, a molecular structure with an alkyl group, a cyano group, a fluorine, or the like present at an end of a biphenyl group, a biphenyl-cyclohexyl group, or the like). Specifically, there are monomers containing polymerizable groups such as acryloyl groups, methacryloyl groups, vinyl groups, epoxy groups, fumarate groups, cinnamoyl groups, and the like in molecular structures; however, the non-liquid-crystalline monomer is not limited to these examples.

The photopolymerization reaction disclosed in this specification may be caused using any kind of light; it is preferable to use ultraviolet rays. Therefore, as the polymerization initiator, for example, an acetophenone, a benzophenone, a benzoin, a benzil, a Michler's ketone, a benzoin alkyl ether, a benzil dimethylketal, or a thioxanthone can be used as appropriate. Note that after the polymer stabilization treatment, the polymerization initiator becomes an impurity that does not contribute to operation of a liquid crystal display device in the polymer/liquid crystal composite; therefore, the amount of the polymerization initiator is preferably as small as possible. For example, the amount of the polymerization initiator is preferably less than or equal to 0.5 wt % in the liquid crystal composition.

The liquid crystal composition may include a chiral material, in addition to the liquid crystal material exhibiting a blue phase, the liquid-crystalline monomer, the non-liquid-crystalline monomer, and the polymerization initiator. Note that the chiral material is a material with which a twist structure is caused in a liquid crystal material. The amount of the chiral material added affects the diffraction wavelength of the liquid crystal material exhibiting a blue phase. Therefore, the amount of the chiral material to be added is preferably adjusted so that the diffraction wavelength of the liquid crystal material exhibiting a blue phase is out of a visible region (380 nm to 750 nm). As the chiral material, S-811 (produced by Merck), S-1011 (produced by Merck), 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.), or the like can be selected as appropriate.

<Polymer Stabilization Treatment>

By subjecting the above-described liquid crystal composition to polymer stabilization treatment (polymerization treatment), a polymer/liquid crystal composite including the liquid crystal material whose blue phase is stabilized with a polymer can be obtained. Note that the polymer stabilization treatment is a treatment for stabilizing the blue phase of the liquid crystal material with a polymer (a polymer network) which is formed by polymerization of the liquid-crystalline monomer and the non-liquid-crystalline monomer contained in the liquid crystal composition.

For example, as the polymer stabilization treatment, a treatment in which the liquid crystal composition is irradiated with ultraviolet rays in a temperature range where the liquid crystal material exhibiting a blue phase exhibits the blue phase or an isotropic phase can be employed. Note that the liquid crystal composition allows the polymer stabilization treatment to be achieved not only in a temperature range where the liquid crystal material exhibiting a blue phase exhibits the blue phase but also in a temperature range where it exhibits an isotropic phase.

This makes it possible to obtain a polymer/liquid crystal composite which includes a polymer (a polymer network) obtained by photopolymerization of the liquid-crystalline monomer and the non-liquid-crystalline monomer contained in the liquid crystal composition, and a liquid crystal material whose blue phase is stabilized with the polymer (the polymer network).

Note that in the case of employing the above-described method to obtain a polymer/liquid crystal composite, it is preferable to select a liquid-crystalline monomer and a non-liquid-crystalline monomer of a liquid crystal composition in view of the fact given below.

Monomers such as the liquid-crystalline monomer and the non-liquid-crystalline monomer contained in the liquid crystal composition are likely to affect the temperature of phase transition between blue and isotropic phases in the liquid crystal material exhibiting a blue phase which is contained in the liquid crystal composition.

Specifically, as the proportion of the polymer contained in the liquid crystal composition increases, the phase transition temperature is lowered (or raised). On the other hand, polymers (polymer network) obtained by polymerization of monomers are unlikely to affect the phase transition temperature. Therefore, as the proportion of the monomers decreases (or the proportion of the polymer increases) through the polymer stabilization treatment (polymerization treatment), the phase transition temperature is also raised (or lowered) linearly. In this regard, in the case of employing the above-described method to obtain a polymer/liquid crystal composite, it is preferable to select monomers capable of lowering the phase transition temperature of the liquid crystal material exhibiting a blue phase, as the liquid-crystalline monomer and the non-liquid-crystalline monomer included in the liquid crystal composition. This can easily cause the phase transition from the isotropic phase to the blue phase in the liquid crystal material in the case of employing the above method.

<Polymer/Liquid Crystal Composite>

The above-described polymer stabilization treatment enables a polymer/liquid crystal composite of one embodiment of the present invention to be obtained.

The polymer/liquid crystal composite of one embodiment of the present invention particularly allows the polymer stabilization treatment to be performed not only in a temperature range where the liquid crystal material exhibiting a blue phase exhibits the blue phase but also in a temperature range where it exhibits an isotropic phase. In particular, the polymer stabilization treatment for obtaining the polymer/liquid crystal composite of one embodiment of the present invention is preferably performed in a temperature range where the liquid crystal material exhibits the isotropic phase or at a temperature higher than or equal to the upper limit temperature at which the liquid crystal material exhibits a blue phase I.

As described above, the polymer/liquid crystal composite exhibiting a blue phase, which is one embodiment of the present invention, has a structure in which orientation periodicities of a plurality of domains are lowered or a structure in which a defective orientation does not occur even when there are orientation periodicities. The use of such a polymer/liquid crystal composite can reduce the occurrence of a defective orientation.

This embodiment can be implemented in combination with any of the other embodiments and the example as appropriate.
(Embodiment 2)

In this embodiment, a liquid crystal display device manufactured using the polymer/liquid crystal composite of one embodiment of the present invention will be described. The liquid crystal display device may be a passive-matrix liquid crystal display device or an active-matrix liquid crystal display device, and in this embodiment, the case where the polymer/liquid crystal composite is applied to an active matrix liquid crystal display device will be described with reference to FIGS. 2A and 2B.

Figure 2A:
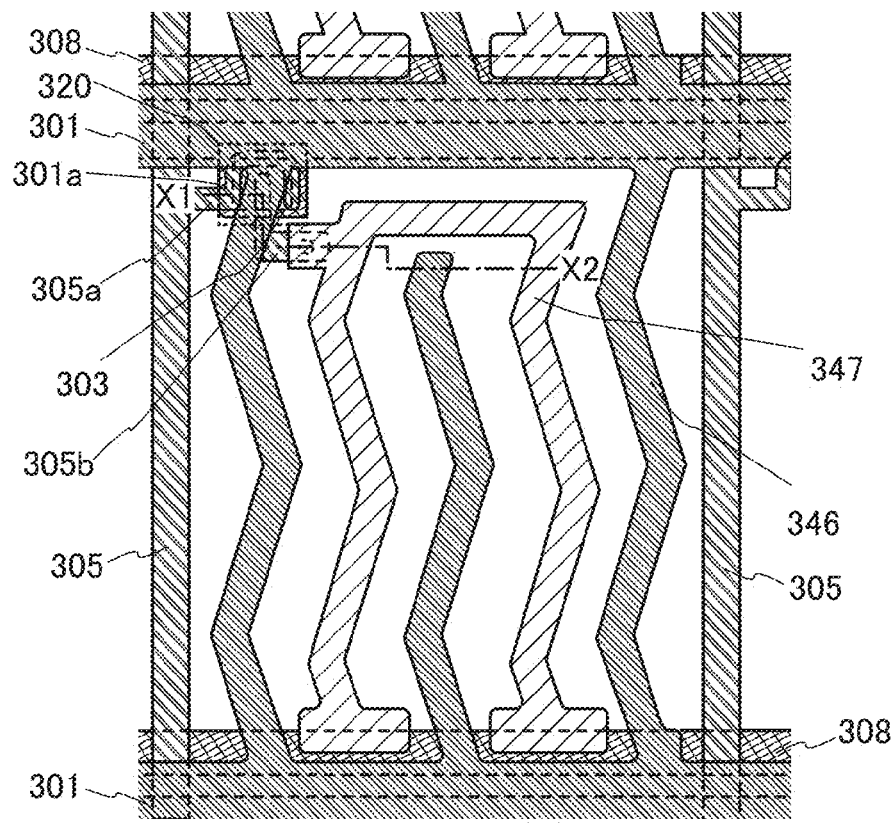
FIGS. 2A and 2B are a plan view and a cross-sectional view, respectively, of a liquid crystal display device.
Figure 2B:
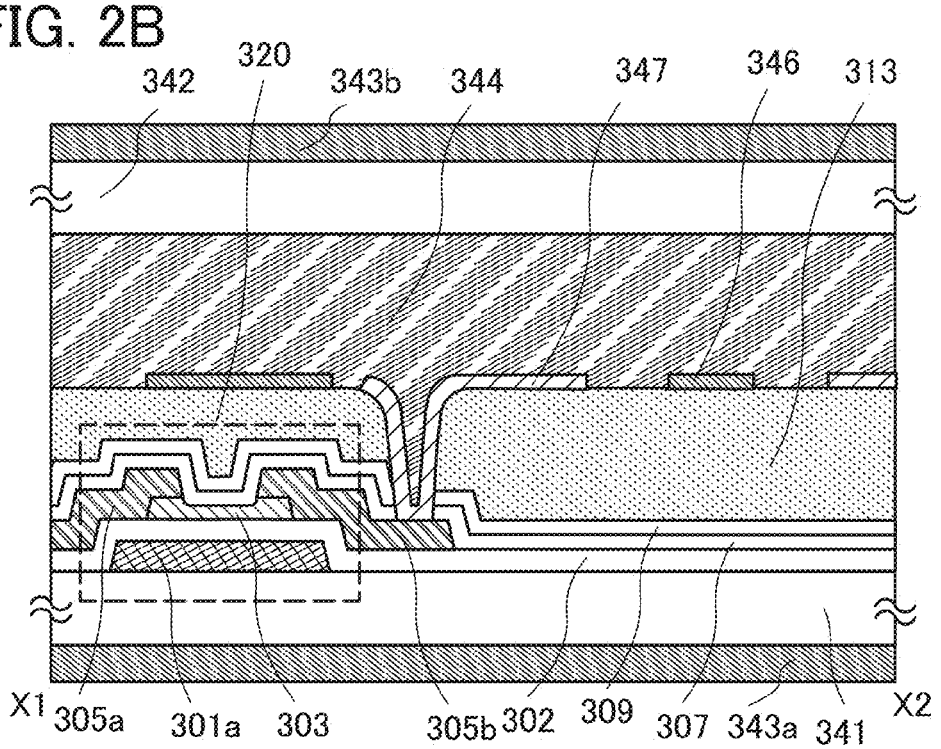

FIG. 2A is a plan view of the liquid crystal display device and illustrates one pixel. FIG. 2B is a cross-sectional view taken along X1-X2 in FIG. 2A.

In FIG. 2A, a plurality of source wiring layers 305 (including a wiring layer 305a) is provided in parallel to each other (extended in the vertical direction in FIG. 2A) and apart from each other. A plurality of gate wiring layers 301 (including a gate electrode layer 301a) is provided apart from each other and extended in the direction substantially orthogonal to the source wiring layers 305 (extended in the horizontal direction in FIG. 2A). A plurality of common wiring layers 308 is provided so as to be adjacent to the corresponding gate wiring layers 301 and extend in a direction parallel to or substantially parallel to the gate wiring layers 301, that is, in a direction perpendicular to or substantially perpendicular to the source wiring layers 305 (the lateral direction in FIG. 2A). A pixel electrode layer 347 and a common electrode layer 346 of the liquid crystal display device are arranged in a space surrounded by the source wiring layers 305, the common wiring layers 308, and the gate wiring layers 301. Note that the pixel electrode layer 347 is electrically connected to a transistor 320, and the transistor 320 is provided in each pixel.

In the liquid crystal display device of FIG. 2A, a capacitor is formed by the pixel electrode layer 347 and the common wiring layer 308. Although the common wiring layer 308 can operate in a floating state (an electrically isolated state), the potential thereof may be set to a fixed potential, preferably to a potential around a common potential (an intermediate potential of an image signal which is transmitted as data) at such a level as not to generate flickers.

In the electrode structure in the liquid crystal display device of FIGS. 2A and 2B, the pixel electrode layer 347 and the common electrode layer 346 are formed in one plane that is parallel to the substrate. A method in which grayscale is controlled by generating an electric field in the direction parallel to a substrate to move liquid crystal molecules in a plane parallel to the substrate (i.e., IPS mode) can be applied Next, a cross-sectional structure of the liquid crystal display device shown in FIG. 2B is described. The liquid crystal display device illustrated in FIG. 2B has a structure in which a liquid crystal layer 344 is provided between a second substrate 342 and a first substrate 341 having the transistor 320, the pixel electrode layer 347, the common electrode layer 346, and the like. Further, polarizing plates 343a and 343b are provided in contact with the first substrate 341 and the second substrate 342, respectively.

Note that the transistor 320 is an inverted staggered thin film transistor in which the gate electrode layer 301a, a gate insulating layer 302, a semiconductor layer 303, and wiring layers 305a and 305b which function as a source electrode layer and a drain electrode layer are formed over the first substrate 341 having an insulating surface.

There is no particular limitation on the structure of the transistor that can be applied to a liquid crystal display device of this embodiment; for example, a staggered type transistor or a planar type transistor having a top-gate structure or a bottom-gate structure can be employed. The transistor may have a single-gate structure in which one channel formation region is formed or a double-gate structure in which two channel formation regions are formed. Alternatively, the transistor may have a dual gate structure including two gate electrode layers positioned over and below a channel region with a gate insulating layer provided therebetween.

In FIG. 2B, the gate electrode layer 301a is formed over the first substrate 341. The gate electrode layer 301a can be formed to have a single-layer structure or a stacked-layer structure using a metal material such as molybdenum (Mo), titanium (Ti), chromium (Cr), tantalum (Ta), tungsten (W), aluminum (Al), copper (Cu), neodymium (Nd), or scandium (Sc), or an alloy material containing any of the metal materials as a main component. By using a light-blocking conductive film as the gate electrode layer 301a, light from a backlight (light emitted through the first substrate 341) can be prevented from entering the semiconductor layer 303.

The gate electrode layer 301a may have a stacked structure. For example, in the case where the gate electrode layer 301a has a two-layer structure, any of the following two-layer structures is preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, and a two-layer structure in which a titanium nitride layer and molybdenum layer are stacked. In the case where the gate electrode layer 301a has a three-layer structure, a stacked structure of a tungsten layer or a tungsten nitride layer, a layer of an alloy of aluminum and silicon or a layer of an alloy of aluminum and titanium, and a titanium nitride layer or a titanium layer is preferable.

Note that a base film formed of an insulating film may be provided between the first substrate 341 and the gate electrode layer 301a. The base film has a function of preventing diffusion of an impurity element from the first substrate 341, and can be formed to have a single-layer structure or a stacked structure using one or more of a silicon nitride film, a silicon oxide film, a silicon nitride oxide film, and a silicon oxynitride film.

The gate insulating layer 302 can be formed to have a single-layer structure or a stacked structure using a silicon oxide layer, a silicon nitride layer, a silicon oxynitride layer, or a silicon nitride oxide layer by a plasma CVD method, a sputtering method, or the like. Alternatively, a silicon oxide layer formed by a CVD method using an organosilane gas can be used as the insulating layer 302. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

A material used for the semiconductor layer 303 is not limited to a particular material and may be determined as appropriate in accordance with characteristics needed for the transistor 320. The semiconductor layer 303 can be formed using any of the following materials: an amorphous semiconductor manufactured by a sputtering method or a vapor-phase growth method using a semiconductor source gas typified by silane or germane; a polycrystalline semiconductor formed by crystallizing the amorphous semiconductor with use of light energy or thermal energy; a microcrystalline semiconductor; an oxide semiconductor; and the like.

A typical example of an amorphous semiconductor is hydrogenated amorphous silicon, while a typical example of a crystalline semiconductor is polysilicon and the like. Polysilicon (polycrystalline silicon) includes high-temperature polysilicon which contains polysilicon formed at a process temperature of 800° C. or higher as its main component, low-temperature polysilicon which contains polysilicon formed at a process temperature of 600° C. or lower as its main component, and polysilicon formed by crystallizing amorphous silicon by using an element or the like which promotes crystallization. Needless to say, as described above, a microcrystalline semiconductor or a semiconductor which includes a crystal phase in part of a semiconductor layer can also be used.

Examples of an oxide semiconductor are an In—Sn—Ga—Zn—O-based oxide semiconductor, an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, a Sn—Al—Zn—O-based oxide semiconductor, an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, In—Ga—O-based oxide semiconductor, an In—O-based oxide semiconductor, a Sn—O-based oxide semiconductor, and a Zn—O-based oxide semiconductor, and the like. Here, for example, the In—Ga—Zn—O-based oxide semiconductor is an oxide containing at least In, Ga, and Zn, and there is no particular limitation on the composition ratio thereof. The In—Ga—Zn—O-based oxide semiconductor may include an element other than In, Ga, and Zn.

The semiconductor layer 303 can be formed by a sputtering method, an LPCVD method, a plasma CVD method, or the like. In an etching step for processing the semiconductor layer 303 into a desired shape, dry etching or wet etching can be used.

As a material for the wiring layers 305a and 305b which serve as the source and drain electrode layers of the transistor 320, there is an element selected from aluminum (Al), chromium (Cr), tantalum (Ta), titanium (Ti), molybdenum (Mo), tungsten (W), copper (Cu), and magnesium (Mg), an alloy containing any of these elements as its component, an alloy in which any of these elements are combined, or the like. Further, in the case where heat treatment is performed, the conductive film preferably has heat resistance high enough to withstand the heat treatment. For example, since the use of aluminum (Al) alone brings disadvantages such as low heat resistance and a tendency to corrosion, aluminum is used in combination with a conductive material having heat resistance. As the conductive material having heat resistance, which is combined with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

Note that the gate insulating layer 302, the semiconductor layer 303, and the wiring layers 305a and 305b may be successively formed without being exposed to the air. When the gate insulating layer 302, the semiconductor layer 303, and the wiring layers 305a and 305b are formed successively without being exposed to the air, an interface between the layers can be formed without being contaminated with atmospheric components or impurity elements contained in the air. Thus, variations in characteristics of thin film transistors can be reduced.

An inorganic insulating film or an organic insulating film formed by a dry method or a wet method can be used as an insulating layer 307 and an insulating layer 309. For example, a silicon nitride film, a silicon oxide film, a silicon oxynitride film, an aluminum oxide film, or a tantalum oxide film, which is formed by a plasma CVD method, a sputtering method, or the like, can be used. Further, an organic material such as a polyimide-based resin, an acrylic-based resin, a benzocyclobutene-based resin, a polyamide-based resin, or an epoxy-based resin can be used. Other than the organic materials given above, a low-dielectric constant material (low-k material), a siloxane-based resin, or the like can be used.

Note that the insulating layer 307 and the insulating layer 309 may be formed to have a stacked structure including a plurality of insulating films formed using the materials given above. For example, the insulating layer 307 and the insulating layer 309 may have a structure in which an organic resin film is stacked over an inorganic insulating film.

An interlayer insulating film 313 can be formed using the same material as the insulating layer 307 and the insulating layer 309. There is no particular limitation on the method for forming the interlayer film 313, and the following method or tool (equipment) can be used depending on the material: spin coating, dipping, spray coating, a droplet discharge method (e.g., an inkjet method), a printing method (e.g., screen printing or offset printing), a roll coater, a curtain coater, a knife coater, or the like.

The pixel electrode layer 347 and the common wiring layer 308 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added. Alternatively, the pixel electrode layer 347 and the common electrode layer 308 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy containing any of these metals; and a nitride of these metals.

The polymer/liquid crystal composite described in Embodiment 1 is used for the liquid crystal layer 344. Note that the polymer/liquid crystal composite can be formed by performing polymer stabilization treatment on a liquid crystal composition including a liquid crystal material exhibiting a blue phase, a liquid-crystalline monomer, a non-liquid-crystalline monomer, a polymerization initiator, and the like.

The use of the polymer/liquid crystal composite of one embodiment of the present invention for the liquid crystal layer 344 can reduce the occurrence of a defective orientation in the polymer/liquid crystal composite exhibiting a blue phase. As the result, defects of a panel of the liquid crystal display device can be reduced, so that the yield of the liquid crystal display device can be improved.

The liquid crystal layer 344 is formed as follows: for example, the liquid crystal composition is provided between the first substrate 341 and the second substrate 342 that is a counter substrate, and then the first and second substrates are bonded together with a sealant (not illustrated). The liquid crystal composition can be provided between the first and second substrates by a dropping method (ODF), or a liquid crystal injection method in which the first substrate 341 and the second substrate 342 are bonded together and then a liquid crystal is injected using a capillary phenomenon or the like.

As the sealant, it is typically preferable to use a visible light curable resin, an ultraviolet curable resin, or a heat curable resin. An acrylic resin, an epoxy resin, an amine resin, or the like can be typically used. Further, a photopolymerization initiator (typically, ultraviolet ray polymerization initiator), a thermosetting agent, a filler, or a coupling agent may be included in the sealant.

After the space between the first substrate 341 and the second substrate 342 is filled with the liquid crystal composition, polymer stabilization treatment (polymerization treatment) is performed by light irradiation, whereby the liquid crystal layer 344 including the polymer/liquid crystal composite of one embodiment of the present invention is formed. The light has a wavelength with which the liquid crystalline monomer, the non-liquid-crystalline monomer, and the polymerization initiator included in the liquid crystal composition react. Through the polymer stabilization treatment (polymerization treatment) by the light irradiation, the liquid crystal layer 344 including the polymer/liquid crystal composite is obtained. Note that in the case of using a photocurable resin as a sealant, curing of the sealant may be performed simultaneously with the polymer stabilization treatment.

Note that owing to the electrode structure of the liquid crystal display device of this embodiment, liquid crystal molecules included in the liquid crystal layer 344 are controlled by an electric field in the horizontal direction. The polymer/liquid crystal composite is aligned so as to exhibit a blue phase and can be controlled in the direction parallel to the substrate; thus, a wide viewing angle can be obtained.

In this embodiment, the polarizing plate 343a is provided on the outer side (on the side opposite to the liquid crystal layer 344) of the first substrate 341, and the polarizing plate 343b is provided on the outer side (on the side opposite to the liquid crystal layer 344) of the second substrate 342. In addition to the polarizing plates, an optical film such as a retardation plate or an anti-reflection film may be provided. For example, circular polarization by the polarizing plate and the retardation plate may be used.

Although not illustrated, a backlight, a sidelight, or the like can be used as a light source of the liquid crystal display device described in this embodiment. Light from the light source is emitted from the first substrate 341 side so as to pass through the second substrate 342 on the viewing side.

In the case of manufacturing a plurality of liquid crystal display devices using a large-sized substrate (a so-called multiple panel method), a division step can be performed before the polymer stabilization treatment is performed or before the polarizing plates are provided. In consideration of the influence of the division step on the liquid crystal layer (such as disorder of orientation due to force applied in the division step), it is preferable that the division step be performed after the attachment of the first substrate 341 and the second substrate 342 before the polymer stabilization treatment.

As described above, in the liquid crystal display device described in this embodiment, the polymer/liquid crystal composite of one embodiment of the present invention is used for the liquid crystal layer, so that a blue phase can be exhibited and a high-image-quality liquid crystal display device which provides high contrast and has a high level of visibility can be provided. In addition, the occurrence of a defective orientation in the polymer/liquid crystal composite exhibiting a blue phase can be reduced. This can reduce defects of a panel in a liquid crystal display device. Moreover, a liquid crystal element employing a blue phase is capable of high-speed response, which enables a liquid crystal display device with higher performance to be achieved.

This embodiment can be implemented in combination with any of the other embodiments and the example as appropriate.

EXAMPLE 1

In this example, a polymer/liquid crystal composite of one embodiment of the present invention was formed and evaluated. In addition, another polymer/liquid crystal composite was formed and evaluated for comparison with the polymer/liquid crystal composite of one embodiment of the present invention. Note that the formed polymer/liquid crystal composites were observed with a confocal laser microscope for the evaluation.

The polymer/liquid crystal composites were each formed by forming a liquid crystal composition and subjecting the liquid crystal composition to polymer stabilization treatment. Note that the polymer/liquid crystal composite of one embodiment of the present invention and the polymer/liquid crystal composite for comparison are described in Condition A and Condition B, respectively. The liquid crystal compositions, polymer stabilization treatment, and polymer/liquid crystal composites in this example are described below.

<Condition A(Present Invention)>
(Liquid Crystal Composition)

The liquid crystal composition in Condition A includes E-8 (abbreviation) (produced by LCC Corporation), 4-(trans-4-n-propylcyclohexyl)-3',4'-difluoro-1,1'-biphenyl (abbreviation: CPP-3FF), and 4-n-pentylbenzoic acid 4-cyano-3-fluorophenyl ester (abbreviation: PEP-5CNF), each of which is a liquid crystal material exhibiting a blue phase, 1,4-bis[4-(6-acryloyloxy-n-hexyl-1-oxy)benzoyloxy]-2-methylbenzene (abbreviation: RM257-O6, produced by SYNTHON Chemicals GmbH & Co. KG) as a liquid-crystalline monomer, dodecyl methacrylate (abbreviation: DMeAc) (produced by Tokyo Chemical Industry Co., Ltd.) as a non-liquid-crystalline monomer, 2,2-dimethoxy-2-phenylacetophenone (abbreviation: DMPAP) (produced by Tokyo Chemical Industry Co., Ltd) as a polymerization initiator, and 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.) as a chiral material.

Shown below are the structural formulae of the substances given above.
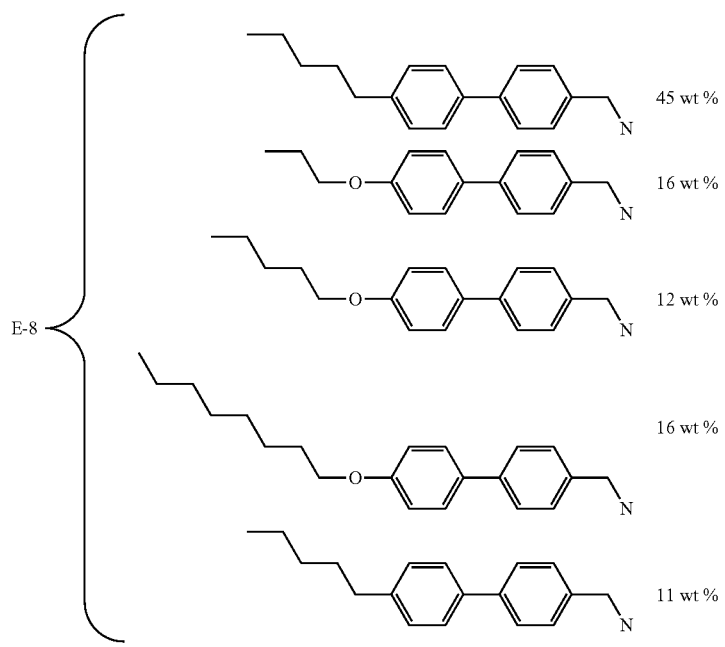
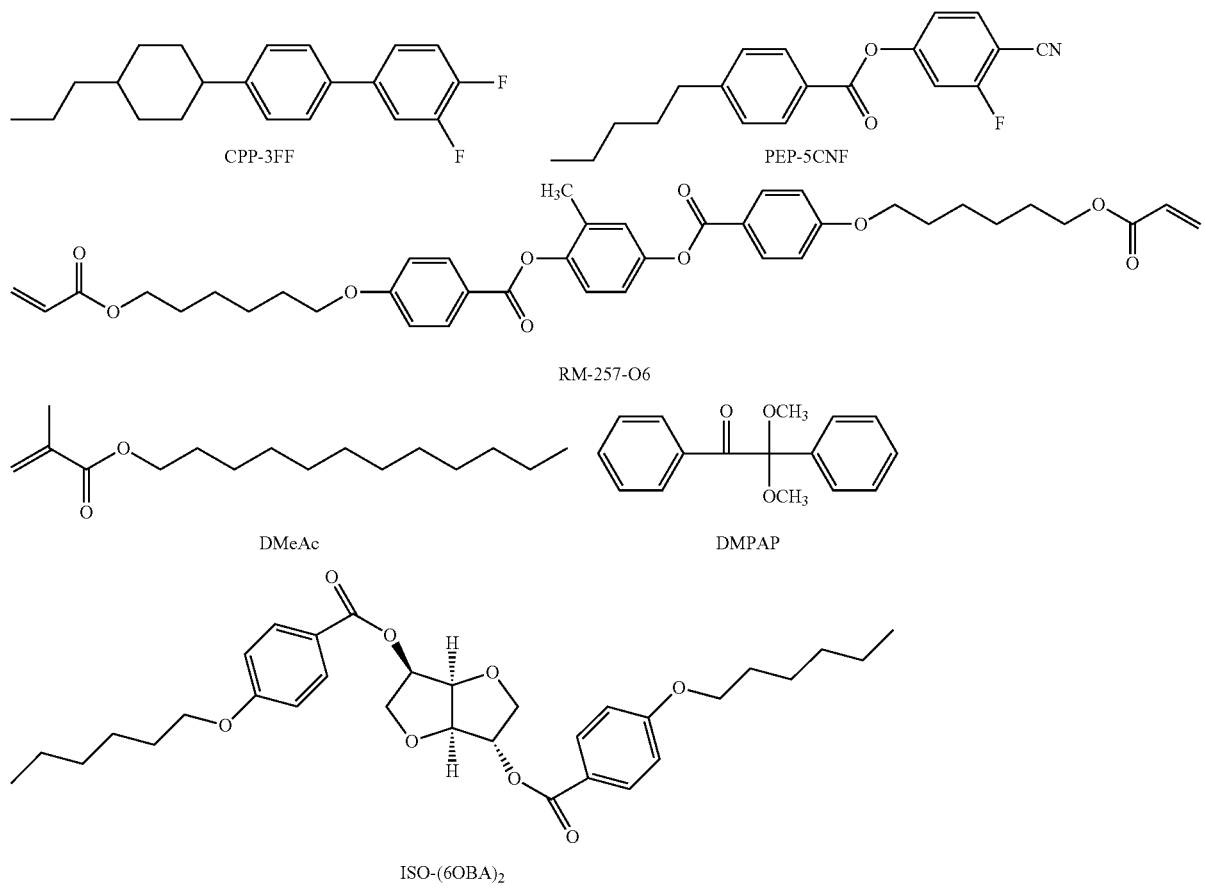

Note that E-8 (abbreviation) that is the liquid crystal material is a mixture of five kinds of substances, namely, 4-cyano-4'-pentylbiphenyl, 4-cyano-4'-propyloxybiphenyl, 4-cyano-4'-pentyloxybiphenyl, 4-cyano-4'-octyloxybiphenyl, and 4-cyano-4''-pentyl-p-terphenyl in proportions (wt %) written besides the above structural formulae. In addition, RM257-O6 (abbreviation) that is the liquid-crystalline monomer is a liquid-crystalline monomer with an oxyalkylene group having a chain length (including carbon atoms and oxygen atoms) of 7.

Table 1 shows the proportions of the substances given above in the liquid crystal composition in Condition A.

TABLE 1

| Classification | Material name | Proportion (wt %) |
| --- | --- | --- |
| Liquid crystal material | E-8 | 33.5 |
| | CPP-3FF | 25.0 |
| | PEP-5CNF | 25.0 |
| Liquid-crystalline monomer | RM257-O6 | 4.0 |
| Non-liquid-crystalline monomer | DMeAc | 4.0 |
| Polymerization initiator | DMPAP | Small amount |
| Chiral material | ISO-(6OBA)$_2$ | 8.0 |
| Total | | 100.0 |

The liquid crystal material included in the liquid crystal composition in Condition A exhibited a blue phase at 27.1° C. to 31.4° C. In other words, the point of phase transition between a cholesteric phase and the blue phase in the liquid crystal material included in the liquid crystal composition was 27.1° C., and the point of phase transition between an isotropic phase and the blue phase therein was 31.4° C.

<Polymer Stabilization Treatment>

Next, the liquid crystal composition in Condition A provided between a pair of glass substrates was sealed by a sealant to fabricate a liquid crystal cell. Then, the liquid crystal cell was subjected to polymer stabilization treatment. Note that the liquid crystal cell was fabricated as follows: the pair of glass substrates with a gap (cell gap) of 4 μm therebetween was attached with the sealant and then the liquid crystal composition was injected into the space between the pair of glass substrates by an injection method.

As the sealant, an ultraviolet and heat curable sealant was used. Furthermore, the sealant was subjected to ultraviolet rays (irradiance: 100 mW/cm$^2$) irradiation treatment for 90 seconds as curing treatment. Then, the liquid crystal cell was subjected to heat treatment at 120° C. for 1 hour. After that, polishing treatment was performed such that the thickness of one of the pair of glass substrates on the side to be observed with a confocal laser microscope became 0.17 mm Note that the thickness of each of the pair of glass substrates before the treatment was 0.7 mm.

The polymer stabilization treatment was performed by raising the temperature to 70° C., at which the liquid crystal material included in the liquid crystal composition in Condition A exhibits an isotropic phase, and then lowering the temperature to 36° C., and by irradiating the liquid crystal cell held in that state with ultraviolet rays (wavelength: 365 nm, irradiance: 8 mW/cm$^2$) for 6 minutes.

<Polymer/Liquid Crystal Composite>

Figure 3A:
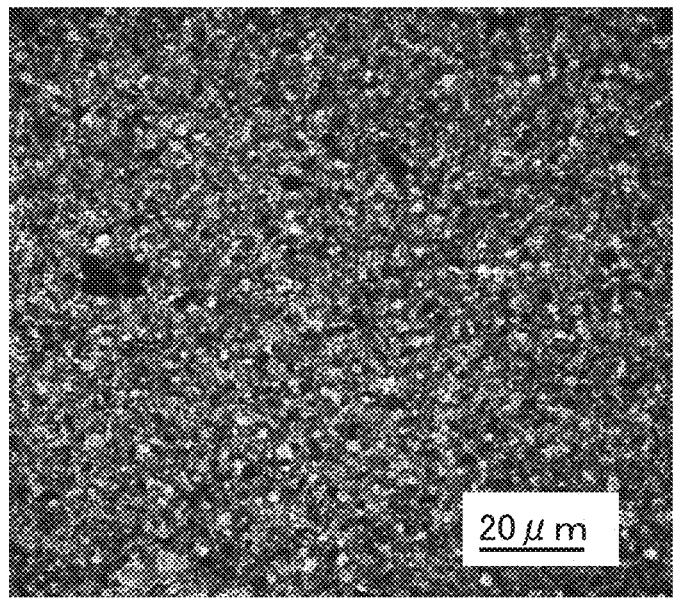
FIGS. 3A and 3B show textures of a polymer/liquid crystal composite.
Figure 3B:
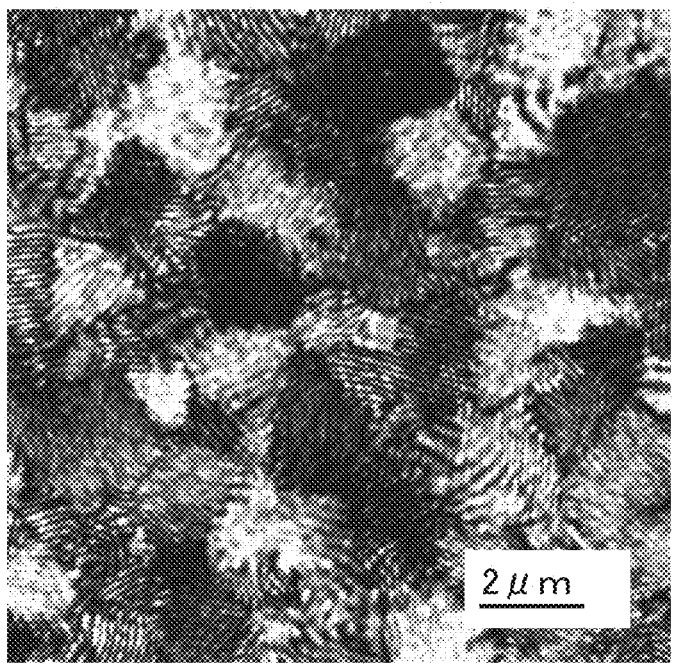

By the above-described polymer stabilization treatment, the polymer/liquid crystal composite in Condition A was obtained. FIGS. 3A and 3B each show a texture of the polymer/liquid crystal composite in Condition A, which was observed with a confocal laser microscope (C2, produced by Nikon Instech Co., Ltd.). Note that the observation was performed under the following conditions: laser light with a wavelength of 401 nm was used, the measurement mode was a reflective mode, and the temperature was room temperature. FIG. 3A shows the texture of the polymer/liquid crystal composite observed with a 100× objective lens. FIG. 3B shows the texture of the polymer/liquid crystal composite observed with the 100× objective lens at a scan rate of 1/10 of that in a normal observation (i.e., an effective magnification of 1000 times).

Note that an optical system of a confocal laser microscope is characterized by the capability of eliminating information of the non-focal plane and extracting only information of the focal plane. In other words, when the focal plane is set as appropriate in the observation with the confocal laser microscope, a desired plane perpendicular to the thickness direction of an object can be observed.

FIGS. 3A and 3B demonstrate that the size of each domain in the polymer/liquid crystal composite in Condition A is 3 μm or less.

<Condition B (Comparative Example)>

(Liquid Crystal Composition)

The liquid crystal composition in Condition B includes E-8 (abbreviation) CPP-3FF (abbreviation), and PEP-5CNF (abbreviation) as a liquid crystal material exhibiting a blue phase, 1,4-bis[4-(3-acryloyloxy-n-propyl-1-oxy)benzoyloxy]-2-methylbenzene (abbreviation: RM257-O3, produced by SYNTHON Chemicals GmbH & Co. KG) as a liquid-crystalline monomer, DMeAc (abbreviation) as a non-liquid-crystalline monomer, DMPAP (abbreviation) as a polymerization initiator, and ISO-(6OBA)$_2$ as a chiral material. In other words, the liquid crystal composition in Condition B includes the same substances as the liquid crystal composition in Condition A except the liquid-crystalline monomer.

The structural formula of RM257-O3 (abbreviation) is shown below.

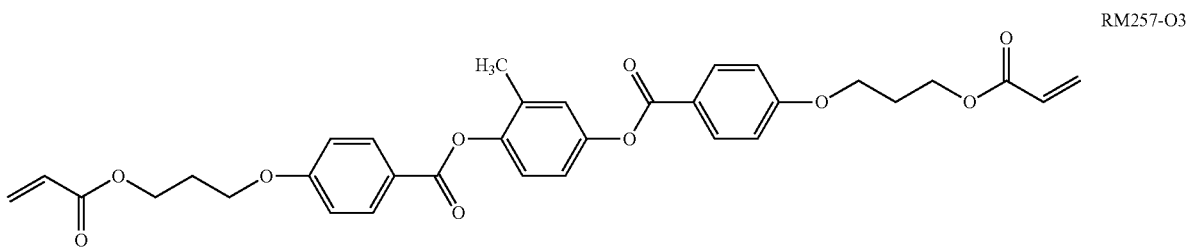 [SMILES: C=CC(=O)OCCCOc1ccc(C(=O)Oc2ccc(OC(=O)c3ccc(OCCCOC(=O)C=C)cc3)c(C)c2)cc1]

RM257-O3

Note that the liquid-crystalline monomer RM257-O3 (abbreviation) is a liquid-crystalline monomer with an oxyalkylene group having a chain length (including carbon atoms and oxygen atoms) of 4.

Table 2 shows the proportions of the substances given above in the liquid crystal composition in Condition B.

TABLE 2

| Classification | Material name | Proportion (wt %) |
|---|---|---|
| Liquid crystal material | E-8 | 33.5 |
| | CPP-3FF | 25.0 |
| | PEP-5CNF | 25.0 |
| Liquid-crystalline monomer | RM257-O3 | 4.0 |
| Non-liquid-crystalline monomer | DMeAc | 4.0 |
| Polymerization initiator | DMPAP | Small amount |
| Chiral material | ISO-(6OBA)$_2$ | 8.0 |
| Total | | 100.0 |

The liquid crystal material included in the liquid crystal composition in Condition B exhibited a blue phase at 27.4° C. to 31.8° C. In other words, the point of phase transition between a cholesteric phase and the blue phase in the liquid crystal material included in the liquid crystal composition was 27.4° C., and the point of phase transition between an isotropic phase and the blue phase therein was 31.8° C.

<Polymer Stabilization Treatment>

Next, the liquid crystal composition in Condition B provided between a pair of glass substrates was sealed by a sealant to fabricate a liquid crystal cell. Then, the liquid crystal cell was subjected to polymer stabilization treatment. Note that the liquid crystal cell was fabricated as follows: the pair of glass substrates with a gap (cell gap) of 4 μm therebetween is attached with the sealant and then the liquid crystal composition was injected into the space between the pair of substrates by an injection method. As the sealant, an ultraviolet and heat curable sealant was used. Furthermore, the sealant was subjected to ultraviolet rays (irradiance: 100 mW/cm$^2$) irradiation treatment for 90 seconds as curing treatment. Then, the liquid crystal cell was subjected to heat treatment at 120° C. for 1 hour. After that, polishing treatment was performed such that the thickness of one of the pair of glass substrates on the side to be observed with a confocal laser microscope became 0.17 mm Note that the thickness of each of the pair of glass substrates before the treatment was 0.7 mm.

The polymer stabilization treatment was performed by raising the temperature to 70° C., at which the liquid crystal material included in the liquid crystal composition exhibits an isotropic phase, and then lowering the temperature to 31° C., and by irradiating the liquid crystal cell held in that state with ultraviolet rays (wavelength: 365 nm, irradiance: 8 mW/cm$^2$) for 6 minutes.

<Polymer/Liquid Crystal Composite>

Figure 4A:
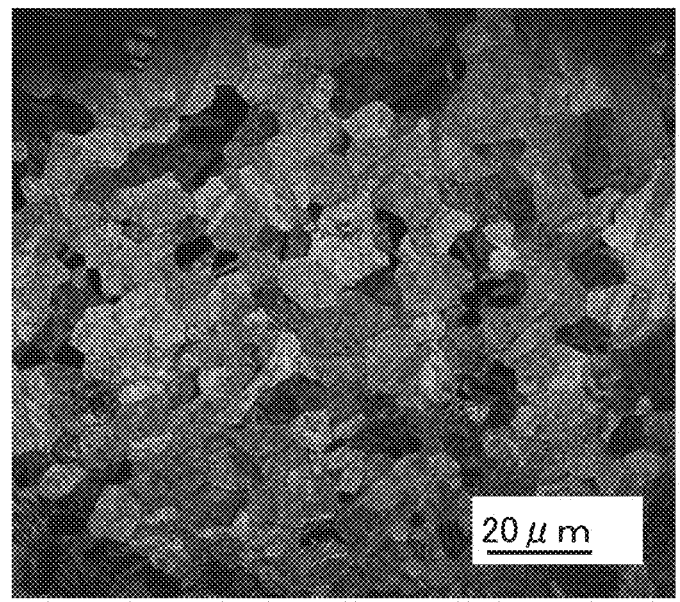
FIGS. 4A and 4B show textures of a polymer/liquid crystal composite.
Figure 4B:
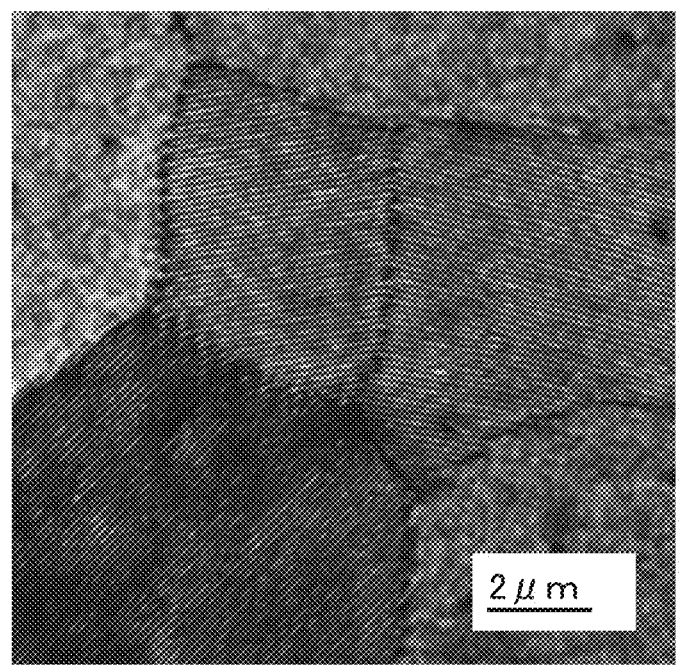

By the above-described polymer stabilization treatment, the polymer/liquid crystal composite in Condition B was obtained. FIGS. 4A and 4B each show a texture of the polymer/liquid crystal composite in Condition B, which was observed with a confocal laser microscope (C2, produced by Nikon Instech Co., Ltd.). Note that the observation was performed under the following conditions: laser light with a wavelength of 401 nm was used, the measurement mode was a reflective mode, and the temperature was room temperature. FIG. 4A shows the texture of the polymer/liquid crystal composite observed with a 100× objective lens. FIG. 4B shows the texture of the polymer/liquid crystal composite observed with the 100× objective lens at a scan rate of 1/10 of that in a normal observation (i.e., an effective magnification of 1000 times).

FIGS. 4A and 4B demonstrate that the size of each domain in the polymer/liquid crystal composite in Condition B is 5 μm to 10 μm.

The size of each domain in the polymer/liquid crystal composite in Condition B is 5 μm to 10 μm. In addition, the continuity between the domains at boundaries between the domains is low because of high orientation periodicities of the domains. In contrast, the size of each domain in the polymer/liquid crystal composite in Condition A, which is one embodiment of the present invention, is 3 μm or less owing to the liquid crystalline monomer and the chiral content. In addition, the orientation periodicities of the domains are lowered. Thus, in the polymer/liquid crystal composite of one embodiment of the present invention, the occurrence of a defective orientation due to high orientation periodicities at a boundary between adjacent domains can be suppressed.

This application is based on Japanese Patent Application serial no. 2012-125660 filed with the Japan Patent Office on Jun. 1, 2012, the entire contents of which are hereby incorporated by reference.

What is claimed is:

1. A liquid crystal device comprising:
   a first substrate;
   a second substrate; and
   a liquid crystal layer between the first substrate and the second substrate; the liquid crystal layer comprising a composite of a polymer and a liquid crystal material,
   wherein the liquid crystal layer exhibits a multi-domain including a plurality of domains in a blue phase, and
   wherein a size of each of the plurality of domains is smaller than and equal to 3 μm.

2. The liquid crystal device according to claim 1, wherein the size is smaller than a thickness of the liquid crystal layer.

3. The liquid crystal device according to claim 1, wherein the plurality of domains continuously include orientation periodicities portions of adjacent domains.

4. The liquid crystal device according to claim 1, wherein the polymer includes a liquid crystalline monomer represented by Structure formula (100)

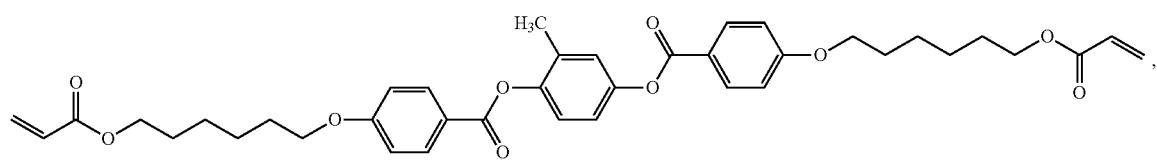

(100)

and
wherein the liquid crystal material includes a chiral material represented by Structure formula (101)

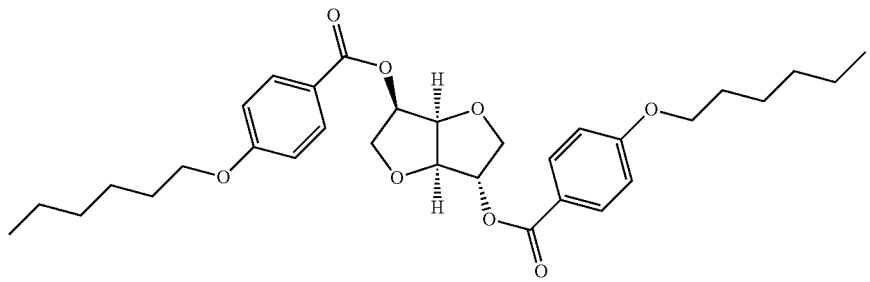

more than and equal to 7%.

5. A liquid crystal device comprising:
a first substrate;
a second substrate; and
a liquid crystal layer between the first substrate and the second substrate; the liquid crystal layer comprising a composite of a polymer and a liquid crystal material,
wherein the liquid crystal layer exhibits a first domain and a second domain in a blue phase, and
wherein a size of each of the first domain and the second domain is smaller than and equal to 3 μm.

6. The liquid crystal device according to claim 5, wherein the size is smaller than a thickness of the liquid crystal layer.

7. The liquid crystal device according to claim 5, wherein the first domain continuously includes an orientation periodicities portion of the second domain.

8. The liquid crystal device according to claim 5, wherein the polymer includes a liquid crystalline monomer represented by Structure formula (100)

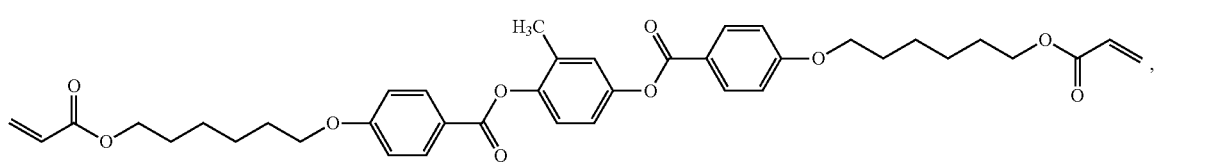

(100)

,and
wherein the liquid crystal material includes a chiral material represented by Structure formula (101)

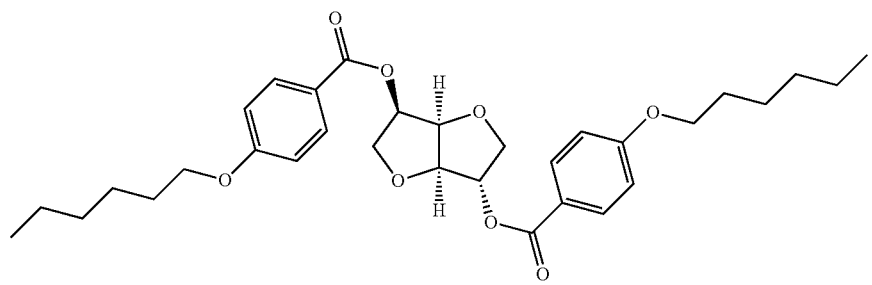

more than and equal to 7%.

9. A liquid crystal device comprising:
a first substrate;
a second substrate; and
a liquid crystal layer between the first substrate and the second substrate; the liquid crystal layer comprising a composite of a polymer and a liquid crystal material,
wherein the liquid crystal layer exhibits a first domain and a second domain in a blue phase, and
wherein a size of each of the first domain and the second domain is smaller than a thickness of the liquid crystal layer.

10. The liquid crystal device according to claim 9, wherein the size is smaller than and equal to 3 μm.

11. The liquid crystal device according to claim 9, wherein the first domain continuously includes an orientation periodicities portion of the second domain.

12. The liquid crystal device according to claim 9, wherein the polymer includes a liquid crystalline monomer represented by Structure formula (100)

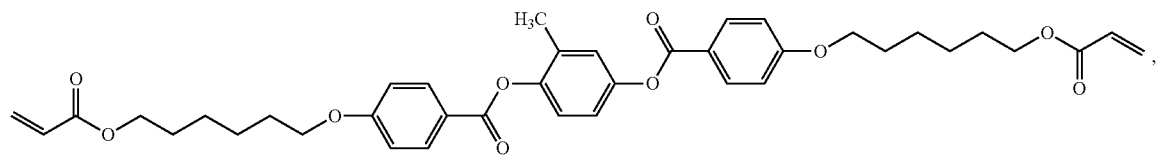

(100)

,and
wherein the liquid crystal material includes a chiral material represented by Structure formula (101)

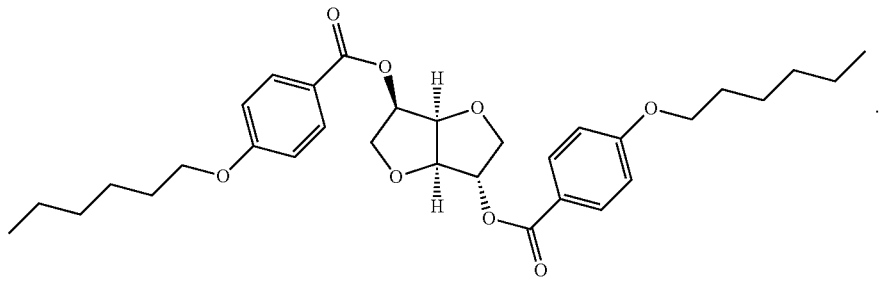 [SMILES: CCCCCCOc1ccc(C(=O)O[C@H]2CO[C@H]3[C@@H]2OC[C@H]3OC(=O)c2ccc(OCCCCCC)cc2)cc1]

more than and equal to 7%.

* * * * *